March 5, 1963 D. K. McLEAN 3,079,888
PIPELINE COATING THICKNESS CONTROL
Filed Oct. 31, 1960

DOUGLAS K. McLEAN
INVENTOR.

BY D. Carl Richard

United States Patent Office 3,079,888
Patented Mar. 5, 1963

3,079,888
PIPELINE COATING THICKNESS CONTROL
Douglas K. McLean, Dallas, Tex., assignor to Harvest Queen Mill & Elevator Company, Dallas, Tex., a corporation of Texas
Filed Oct. 31, 1960, Ser. No. 65,985
6 Claims. (Cl. 118—7)

This invention relates to application to the inside of pipelines, either in situ or before installation, of a coating which is adapted to prevent or inhibit corrosion of, and/or improve the surface smoothness or slickness of, the pipeline walls.

Such a method for coating pipeline interiors is disclosed in Patent No. 2,480,358 to A. C. Curtis, et al. In accordance with this sytem, a pair of plugs are positioned at one end of a section of pipe spaced apart one from another with a predetermined quantity of coating material in liquid form disposed between the plugs. Generally speaking, the coating material found most desirable is of the class known as epoxy resins which have the property that they will set and harden a period of time after application to form a film on the inside of the pipeline which is corrosion resistant. Such resinous material utilized for coating has been found to present a problem in its application in that it is of relatively light consistency, non-viscous and free-flowing, when first placed in the pipeline but as the two plugs are moved along the length of the pipe propelling the coating material therebetween and at the same time applying a thin coat to the interior by action of the trailing plug, the coating material tends to become thicker and of greater viscosity as the curing process proceeds. Thus it has been found that the coating of substantially greater thickness is sometimes applied at the end of the coating operation than at the beginning. This is particularly so when a coating with a short pot life is used for long passes at one time. The viscosity also varies with temperature of the coating material and this temperature is affected by exothermic reaction, friction, pressure and pipe temperatures. It is desirable to maintain the coating at a predetermined minimum thickness in order to conserve the coating material and thereby substantially reduce cost. At the same time the coating applied to the pipe interior should be of sufficient thickness to provide a corrosion barrier and also to present a smooth slick surface to liquids or gases passing through the pipe. Another desirable attribute of such interior coating is that it reduces the frictional forces and turbulence of the products passed through the pipeline and thus effectively increases the throughout capacity by substantial amounts.

In order to overcome the inherent difficulty present by reason of the change in the character of the coating material with time and temperature, applicant has provided a new method and apparatus for carrying out a coating operation whereby it may be assured that a substantially uniform coating will be applied to the pipeline interior throughout the entire length and over the entire period spanned by the coating operation. More particularly, in accordance with the present invention, there is provided a method of applying a protective coating to the interior wall of an elongated pipeline wherein a confined body of coating material is propelled along the length of the pipeline, the coating material being maintained in contact with the walls of the pipeline. An outwardly directed coating applying force is applied to the walls of the pipeline to spread a thin coat of the material over the entire circumferential area thereof. The thickness of the coating in the region of the point of maximum pressure is sensed continuously and in response to a physical signal thus produced, the pressure at the point of application is proportionately varied in order to maintain the thickness a constant value in spite of variations in viscosity of the coating material.

In accordance with a further aspect of the invention, there is provided a system which includes a unit adapted to be moved through a pipeline having at least one peripheral contacting member of variable diameter adapted to follow and spread a coating material over the interior wall of the pipeline. Means carried by the contacting member is adapted to sense the spacing between the contacting member and the pipeline wall for production of a signal variable in dependence upon variations in such spacing. A means responsive to the signal connected to the sensing means is then provided for controlling the diameter of the contacting member to maintain the thickness at a predetermined value.

In a more specific aspect of the invention, a trailing plug in a pipeline coating system is adapted to be moved through the pipeline under hydrostatic or pneumatic pressure applied to the trailing side thereof and to move ahead of the same a predetermined quantity of coating material. The unit is provided with a peripheral contacting member variable in its diameter in response to variations in internal hydraulic pressure. A magnetic sensing system including at least one magnetic detecting head carried by the contacting member is adapted to produce a signal representative of variations in the distance between the contacting member and the wall of the pipeline. Means including a pneumatic servo-system is connected to said last named means to produce variations in the pneumatic pressure inside said contacting member to vary the diameter thereof and maintain substantially constant the spacing between said contacting member and said pipeline and thus the thickness of the coating of said material applied to the interior wall of said pipeline as the unit is moved therealong.

For further objects and advantages of the invention and for a more complete description thereof, reference may now be had to the following description taken in conjunction with the accompanying drawings in which:

FIG. 1 diagrammatically illustrates a pipeline coating system;

Figure 1:
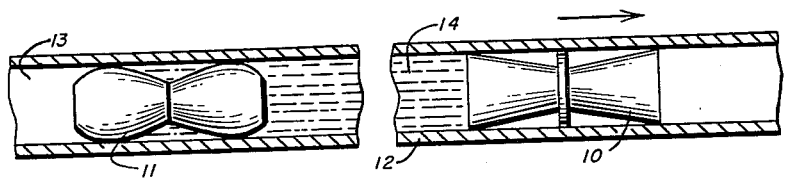

Referring now to FIG. 1, there is illustrated a pipeline coating system of the type generically disclosed in the above-identified Patent No. 2,480,358 to Curtis, et al. wherein a leading plug 10 and a trailing plug 11 are adapted for movement along the length of pipeline 12 under a force developed by hydrostatic pressures in the zone 13 behind the trailing plug 11. A body of coating material is provided in the space between the leading plug 10 and trailing plug 11. As the plugs 10 and 11 are moved along the length of the pipeline, a thin coating of the material in zone 14 is spread along the circumferential area of the walls of the pipeline 12. The thickness of the coating thus applied by the trailing unit 11 depends upon the combination of a number of factors one of which is the consistency of the material being applied. The second factor is the force with which the walls of the trailing unit 11 are forced outwardly against the walls of the pipeline 12. A third will depend somewhat upon the force developed behind the trailing plug to propel the units through the pipeline along with the force which the plugs must overcome in order to be moved through the pipeline. A fourth is the velocity at which the plugs travel. A fifth is believed to be the size of the metering holes in the plug.

It has been found, as above noted, that in coating long pipelines the viscosity of the materials ordinarily employed varies with time and temperature, so that a relatively thin coating will be applied at the start of a coating operation. However, as time passes and the unit moves towards the remote end of the pipeline, the consistency so changes that the coating on the interior walls of the pipeline may be thicker. Not only does this result in the use of more coating compound than is necessary, but also the capacity of the pipeline is reduced by using thicker coatings. Both factors indicate the desirability of maintaining a thin coating of uniform thickness the entire length of the pipeline. It is now believed that a coating thickness of 1½ to 2 mils should suffice to increase throughput but 5 to 10 mils is satisfactory for both increase in throughput plus protection against corrosion.

In accordance with the present invention, the trailing end of the trailing plug 11 is adapted to apply pressure to the pipeline walls so that the thickness of the coating deposited on the pipeline walls depends upon the action of the unit 11. A sensing unit is positioned at or adjacent the point of contact of unit 11 with the pipeline walls and a pressure developing system is then connected to the detector so that pressure will be varied on the trailing unit 11 so as to maintain constant the thickness of the film applied to the pipeline in spite of variations in consistency of the coating material.

Figure 2:
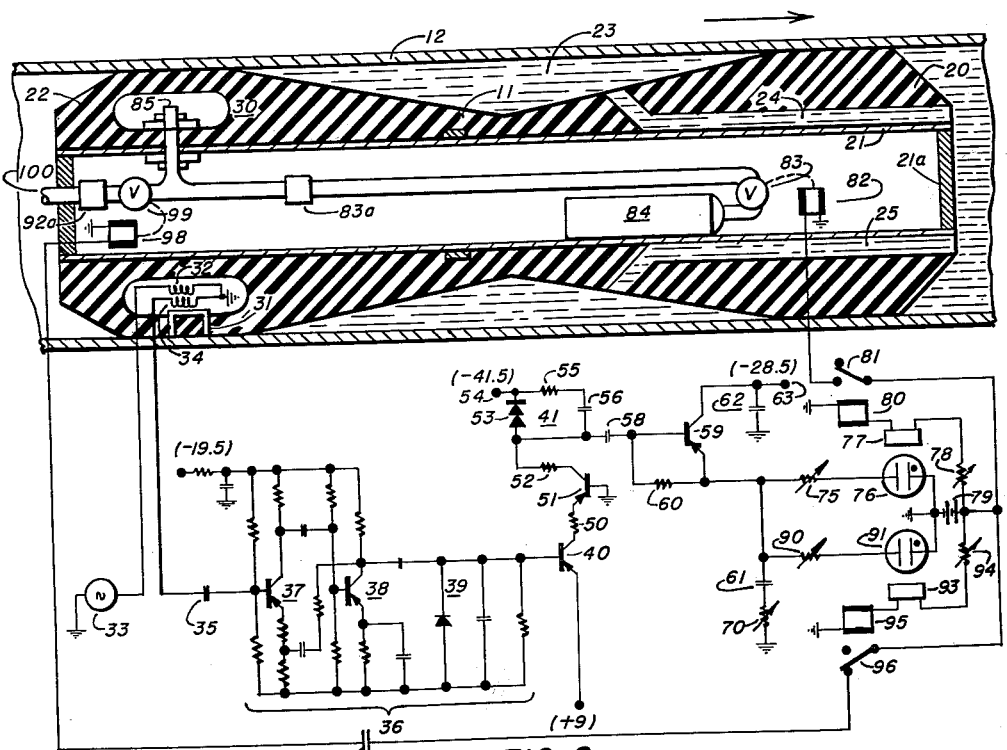
FIG. 2 illustrates a thickness responsive unit of the system of FIG. 1.

A system for carrying out the present method is illustrated diagrammatically in FIG. 2 which shows the unit 11 partly in section together with a control and actuating system, which are illustrated schematically and which should be understood as being mounted within the unit 11 for movement therewith along the length of the pipeline 12. The unit 11 has a forward cone-shaped element 20 which is mounted on an instrument casing 21, preferably in the form of a cylinder which extends the length of the unit 11 but can be in several sections to permit the assembly to turn corners. The forward end of cylinder 21 is closed by a suitable plug 21a which may be removable and sealed with a gasket. The cone-shaped member 20 is secured to the outer walls of cylinder 21. In a preferred embodiment, the unit 20 will comprise a molded rubber body which is bonded to the tube 21. Unit 20 may be of unitary nature and form a part of the trailing portion 22. The forward portion 20 has a plurality of ports extending therethrough from the end which faces the plug 21a to the zone 23 at the mid-point of unit 11. The coating materials moving through pipeline 12 ahead of unit 11 may pass through channels 24 and 25 to zone 23. The materials thus entering zone 23 then flow outward along the cone-shaped walls of the trailing portion 22. The portion 22 is circular in shape and is of such dimension as to tend to contact the inner walls of pipeline 12. The force with which the cone-shaped walls are urged outward toward the pipeline walls in the present invention is dependent upon the pneumatic pressure developed in annular chamber 30. Since both the forward element 20 and the rear element 22 are of resilient material, preferably of rubber, hydrostatic pressures within the chamber 30 may be varied to control the force with which the contact between element 22 is maintained with the coating material being applied to the wall of tube 12. By varying the pressure, the thickness of the coating of materials in zone 98 may be controlled.

The thickness of such coating material in accordance with the present invention is continously sensed and utilized to control the pressure in the chamber 30. More particularly and as illustrated in FIG. 2, a magnetic detecting head 31 is embedded in the outer wall of the unit 22 at a point adjacent the walls of the pipeline 12. A first winding 32 is associated with the detector 31 and is connected to an excitation source 33. The second winding 34, the detector winding, is connected by way of condenser 35 to the input of an amplifier unit 36. The latter amplifier including two transistor amplifier stages 37 and 38 with a full-wave rectifying stage 39 applies to the output transistor 40 a current which is proportional to the thickness of the coating applied to the inner walls of pipeline 12. As the spacing varies due to variations in such coating thickness, the magnetic flux in detector 31 will vary, thereby producing a thickness-dependent signal. The current thus flowing through the transistor 40 applied to a circuit 41 which serves to convert current to voltage pulses, the number of which is directly proportional to the magnitude of the current in the transistor 40.

The collector electrode of transistor 40 is connected by way of resistance 50 to the emitter of a transistor 51. The base of transistor 51 is connected to ground and the collector electrode thereof is connected by way of resistor 52 to the positive terminal of a four layer diode 53. The negative terminal of diode 53 is connected to the negative terminal 54 of a suitable D.C. source. The negative terminal of diode 53 is also connected by way of resistor 55 and condenser 56 to the positive terminal of diode 53. The positive terminal of diode 53 is also connected by way of condenser 58 to the base of a cathode-follower unit 59. The base of unit 59 is also connected by way of resistor 60 to the emitter and to one terminal of a holding condenser 61. The collector of the transistor, a cathode-follower stage 59, is connected to ground by way of condenser 62 and to terminal 63, the negative terminal of a suitable D.C. voltage supply. Unidirectional current from the source 54 under the control of transistor unit 51 and its associated circuit is converted into a train of output pulses by operation of diode 53 and the circuit parallel thereto comprising resistor 55 and condenser 56. The time rate of occurrence of the output pulses is proportional to the magnitude of the current flowing from source 54.

More particularly, the amplifier 36 controls the transistor 51. Transistor 51 has a characteristic in which the current flowing in the collector-base circuit is independent of voltage applied thereto. Unit 51 has the base thereof connected to ground. The control signal from the output stage of amplifier 36 is applied as a varying D.C. voltage to the emitter of the unit 51. As well understood, the common base-collector current characteristic is substantially linear and independent of collector voltage. A common base transistor circuit such as illustrated is therefore well suited to the present purpose, it being desired periodically to charge condenser 56 linearly with time and to discharge the same through the four-layer diode 53 each time the condenser voltage reaches the critical voltage of the diode 53. Resistor 55 serves as a peak current limiter in the discharge circuit of condenser 56. Control current from the transistor 40 applied to the emitter electrode of transistor 51 appears in the output terminal or collector electrode thereof in proportion to the input current, the output current however being independent of the voltage applied to the output terminal. This being the case, the condenser 56 may be substantially completely discharged through diode 53 without noticeable change in the current flowing from source 54. By this means there is provided on condenser 61 a voltage which varies as it is periodically charged by pulses from the output unit 59 in dependence upon the thickness of the coating of material in the region of the magnetic detector 31.

The voltage across condenser 61 may then leak off to ground by way of variable resistor 70. However, the time constant is such that the voltage on condenser 61 will follow substantially the variations in thickness of the pipeline coating as the plug 11 is moved along the length of the pipeline. The voltage across condenser 61 is then utilized to control the pressure in the chamber 30. Two control systems are employed. In the first, the voltage on condenser 61 is applied by way of resistor 75 and a neon tube 76 to ground. Neon tube 76 is associated with a photo-detector 77. One terminal of detector 77 is connected by way of a variable resistor 78 to the positive terminal of a battery 79, the negative terminal of which is connected to ground. The other terminal of detector 77 is connected by way of a relay coil 80 to ground. Thus the current flowing in the detector 77 will be dependent upon the amount of illumination thereof by neon tube 76 which in turn is controlled by the voltage on condenser 61. When illumination reaches a predetermined threshold value dependent upon the voltage on condenser 61, current through the relay coil 80 will actuate armature 81 to close a circuit from battery 79 through a second relay coil 82. Upon energization of coil 82, a valve 83 is opened. Valve 83 is positioned in a supply line leading from a storage vessel 84, the line leading to a discharge port 85 in the chamber 30. The line leading from valve 83 also includes a snubber 83a of the type in which the gas flow passes through a sintered bronze or stainless steel mass thereby to control the flow. The valve 83 preferably is an on-off valve with no attempt to proportion the flow in the valve itself but rather to control flow in the snubber 83a. The vessel 84 preferably will contain compressed gas such as nitrogen or other suitable gas. By varying the amount of gas pressure applied to the chamber 30, the pressure applied to the coating point will be varied. By suitably setting the controls (resistors 75 and 78) in the circuits of neon tube 76 and detector 77, the maximum thickness may be controlled. When the thickness exceeds a predetermined value, valve 83 will be opened to increase the pressure in zone 30 thereby reducing the thickness to the preset level.

A second control system will determine the minimum thickness. More particularly, the voltage on condenser 61 is applied by way of resistor 90 to a neon tube 91 which is connected to ground. A photo-detector 93 is connected at one terminal by way of resistor 94 to the positive terminal of battery 79. The other terminal of detector 93 is connected by way of relay coil 95 to ground. The armature 96 associated with coil 95 is connected to the positive terminal of battery 79. The normally closed terminal associated with armature 96 is connected by way of condenser 97 through a relay coil 98 to ground. Relay coil 98 is coupled to a valve 99 in the exhaust line 100 leading from the chamber 30.

A snubber 99a is also included in the exhaust line 100 leading from chamber 30. Valve 99 preferably is an on-off valve with the rate of discharge of gas from chamber 30 being controlled by the snubber 99a when valve 99 is open. When the thickness of the coating applied to the inside of the pipeline is less than a predetermined minimum thickness, the photo-cell 93 will serve to actuate the relay coil 95 which will open the excitation circuit for the relay coil 98, thereby to permit valve 99 to be opened to relieve the pressure in the chamber 30.

By suitably setting the time constants of the circuits involved in the neon tubes 76, 91 and detectors 77 and 95, or through proper selection of snubbers 83a and 99a the thickness of the coating may be maintained within predetermined or preset limits.

Figure 3:
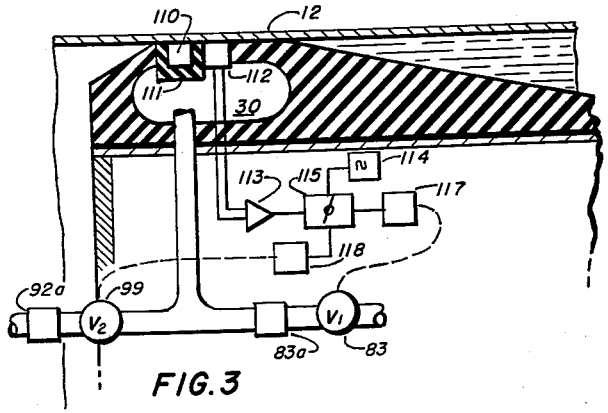
FIG. 3 is a modification of the thickness responsive unit.

Referring now to FIG. 3, there is illustrated a further embodiment of the invention in which a radioactive source 110 is mounted in a shield 111. Adjacent to the source 110 there is provided a radioactive detector 112. The geometry is such that the intensity of the radiation impinging detector 112 will be proportional to the thickness of the coating on the inside wall of the pipeline 12. The signal from detector 112 is applied to an amplifier-frequency converter 113. The output of the converter 113 is an alternating current signal, the frequency of which is proportional to the coating thickness. An oscillator 114 is connected to one input of a phase comparator 115. The output of converter 113 is connected to the second input thereof. The oscillator 114 is preset for a given wall coating thickness. When the coating thickness exceeds that preset limit as indicated at the output of the phase comparator 115, unit 117 is actuated to open valve 83 thereby to increase the pressure in zone 30. When the pressure inside zone 30 is too great, making the coating too thin, the unit 118 will actuate valve 99 to relieve the pressure in the zone 30 at a rate controlled by the snubber 92a thereby to increase the thickness of the coating. Thus in FIG. 2 a magnetic detecting system is employed. In FIG. 3 a radioactive sensing system is utilized. It would be readily apparent that other types of systems may be employed both in the actual control of the valve as well as in the sensing of the wall thickness. It is therefore intended and contemplated that other systems may be employed for carrying out the present method.

In the embodiment of the system of FIG. 3 the coating material preferably is supplied with quantities of an element which normally is stable but which is excited in response to a neutron bombardment. In this case source 110 would be a neutron source such as polonium, beryllium capsule. In another embodiment a radioactive isotope is thoroughly admixed with the coating material, in which case the source 110 is eliminated. Detector 112 in this instance has an output proportional to the total quantity of the isotope and thus dependent upon the thickness.

As a further embodiment, a suitable X-ray system may be employed for sensing coating thickness so that the present method may be carried out to provide a coating on the inside of a pipeline which is of uniform thickness throughout the entire length. Thus while the invention has been explained in connection with the foregoing embodiments, it is to be understood that further embodiments may now suggest themselves to those skilled in the art and it is intended to cover such embodiments as fall within the scope of the appended claims.

What is claimed is:

1. In a system for applying a protective coating to the interior wall of an elongated pipeline in situ, the combination which comprises a unit adapted to be moved through said pipeline, having at least one peripheral contacting member of variable diameter adapted to spread said coating over said interior wall, sensing means carried by said member for sensing the thickness of said coating in the region of the peripheral contact point, and means carried by said unit responsive to said sensing means for maintaining said thickness at a predetermined value.

2. In a system for applying as a film a mass of protective coating material to the interior wall of an elongated pipeline in situ the system which comprises a unit adapted to be moved through said pipeline to propel said material, having at least one peripheral contacting member of variable diameter adapted to spread said coating over said interior wall, sensing means carried by said member for generating a signal dependent upon the thickness of said coating at the peripheral contact point, and means carried by said unit connected to said sensing means responsive to said sensing means for maintaining said thickness at a predetermined value.

3. In a system for applying as a film a mass of protective coating material on the interior wall of an elongated pipeline in situ, the combination which comprises a unit adapted to be moved through a pipeline to propel said material and having at least one resilient peripheral contacting member adapted to spread said coating material over said interior wall, said contacting member having an internal annular chamber therein, means carried in the wall of said member for sensing the thickness of said coating in the region adjacent said annular chamber, and means responsive to said sensing means pneumatically for varying the pressure in said chamber to maintain constant the diameter of said contacting member to maintain the thickness of said coating at a predetermined value.

4. In a system for applying as a film a mass of protective coating material on the interior wall of an elongated pipeline in situ, the combination which comprises a unit adapted to be moved through a pipeline to propel said material and having at least one resilient peripheral contacting member adapted to spread said coating material over said interior wall, said contacting member having an internal annular chamber therein, and an electropneumatic system including a magnetic detector carried in the wall of said member for sensing the thickness of said coating in the region adjacent said annular chamber pneumatically to vary the pressure in said chamber to maintain constant the diameter of said contacting member to maintain the thickness of said coating at a predetermined value.

5. In a system for applying as a film a mass of protective coating material on the interior wall of an elongated pipeline in situ, the combination which comprises a unit adapted to be moved through a pipeline to propel said material having at least one resilient peripheral contacting member with a cone-shaped leading surface adapted to spread said coating material over said interior wall, said contacting member having an internal annular chamber, means carried in the wall of said member posteriorly of said cone-shaped surface for sensing the thickness of said coating in the region adjacent said annular chamber, and means responsive to said sensing means pneumatically for varying the pressure in said chamber to maintain the thickness of said coating at a predetermined value.

6. In a system for applying as a film a mass of protective coating material on the interior wall of an elongated pipeline in situ, the combination which comprises a unit adapted to be moved through a pipeline to propel said material having at least one resilient peripheral contacting member with a cone-shaped leading surface for delivering said coating material into contact with said interior wall, said contacting member having an internal annular chamber located posteriorly of said cone-shaped surface, means carried in the wall of said member posteriorly of said cone-shaped surface for generating a signal proportional to the thickness of said coating in the region adjacent said annular chamber, and means connected to said sensing means and responsive to said signal pneumatically to vary the pressure in said chamber to maintain the thickness of said coating at a predetermined value.

References Cited in the file of this patent
UNITED STATES PATENTS

| | | |
|---|---|---|
| 2,399,544 | Danner | Apr. 30, 1946 |
| 2,707,934 | Curtis | May 10, 1955 |

UNITED STATES PATENT OFFICE
CERTIFICATE OF CORRECTION

Patent No. 3,079,888                      March 5, 1963

Douglas K. McLean

It is hereby certified that error appears in the above numbered patent requiring correction and that the said Letters Patent should read as corrected below.

Column 1, line 40, for "temperatures" read -- temperature --; line 50, for "throughout" read -- throughput --; column 4, line 5, before "applied" insert -- is --.

Signed and sealed this 5th day of November 1963.

(SEAL)
Attest:

ERNEST W. SWIDER
Attesting Officer

EDWIN L. REYNOLDS
Acting Commissioner of Patents